May 7, 1968

J. GRAY 3,381,451

APPARATUS FOR FORMING A CLOSURE ON THE END
OF A CYLINDRICAL CONTAINER

Filed May 20, 1965

INVENTOR
JAMES GRAY

ATTORNEY

May 7, 1968

J. GRAY 3,381,451

APPARATUS FOR FORMING A CLOSURE ON THE END
OF A CYLINDRICAL CONTAINER

Filed May 20, 1965

INVENTOR
JAMES GRAY

ATTORNEY

United States Patent Office 3,381,451
Patented May 7, 1968

3,381,451
APPARATUS FOR FORMING A CLOSURE ON THE END OF A CYLINDRICAL CONTAINER
James Gray, Toronto, Ontario, Canada, assignor to Tupak Corporation, Toronto, Ontario, Canada, a corporation of Canada
Filed May 20, 1965, Ser. No. 457,308
2 Claims. (Cl. 53—393)

ABSTRACT OF THE DISCLOSURE

An apparatus for closing tubular containers, such as coin wrappers or cardboard mailing tubes, which has a pair of oscillating formers to engage and deform peripheral sections of a tube and adjusting means to provide for tubes of various diameters.

This invention relates to improvements in a method of closing the open end of a tubular container and apparatus therefor.

Coin wrappers, cardboard mailing tubes and other cylindrical containers are in wide use and many types of end closures are employed to secure the contents therein. A conventional device is to snap in one or more peripheral sections of the tube wall about its open end so that they lie substantially radially or transversely of the tube's axis and so serve to close the end of the tube at least partially, to restrain or prevent the accidental or unauthorized displacement of the tube's contents.

An object of the present invention is to provide a method of deforming a tube end by angularly engaging the perimeter of the open mouth and pressing a portion of the same inwardly so that the central part thereof lies approximately transversely of the tube or radially of the axis thereof.

A further object of the invention is to provide an apparatus for closing tube ends utilizing an oscillating former to engage and deform one or more peripheral sections.

A further object of the invention is to provide a tube end closing apparatus in which a tube may be adjustably supported relative to the end closure former as regards both the level and longitudinal positioning thereof.

A further object of the invention is to provide an apparatus for closing the end of a tube utilizing more than one forming tool and having means for adjusting the action of the respective tools.

A still further object of the invention is to provide an apparatus of the nature and for the purpose described that is characterized by structural simplicity, functional efficiency and fast economic operation whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
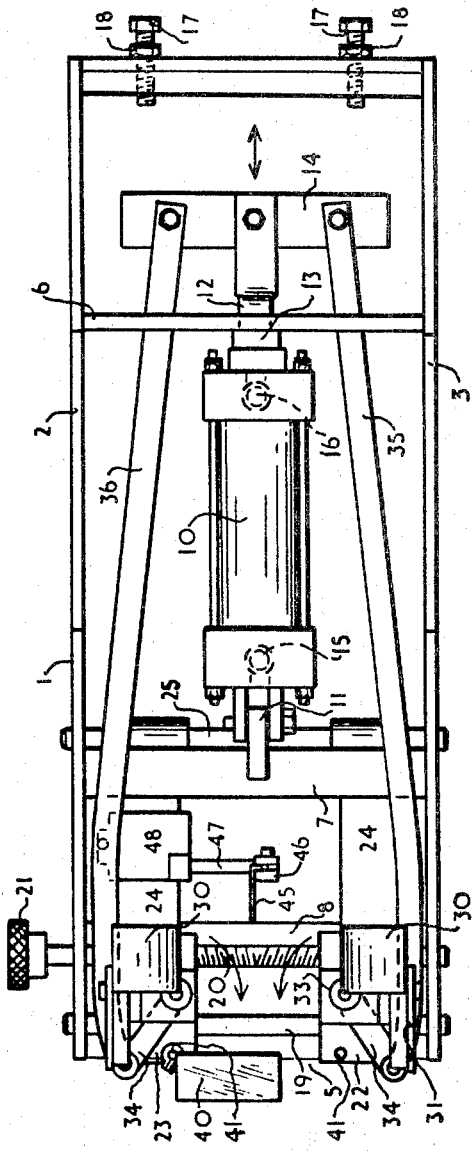
FIGURE 1 is a plan view of tube end closing apparatus embodying my invention.

In developing a method of and apparatus for closing the end of a tube or other cylindrical container, special consideration has been had for obtaining a regulated and uniform degree of closure. For example, if two or more peripheral sections on the end of a tube are to be displaced inwardly, it is desirable that they be of substantially equal size and shape. Additionally, when a tube end closure is the object sought, an inwardly displaced pair of peripheral sections should each be of a depth to reach one-half way across the tube and so meet at the tube's transverse median—while, on the other hand, a partial closure only may be wanted for a so-called packaging tube, in which case the inwardly displaced peripheral section or sections should be shallower and extend something less than halfway across the tube. Accordingly, the diameter of the tube end closing former relative to the diameter of the tube is an important factor, but no less significant is the longitudinal positioning of the tube to be acted on relative to the axis of rotation of the oscillating former and also important are the adjustment of the horizontal level of the tube rest and the accurate regulation of the timing and the length of the swing of the formers.

Reference is now had to the drawings of the instant tube end closing apparatus wherein a frame 1 is shown that is of generally rectangular form having opposite parallel sides 2 and 3 and a transverse back or rear end 4. The frame sides 2 and 3 are disposed vertically as walls and are downwardly offset toward an open front 5, being held in parallel spaced relation by the vertical rear end wall 4, a cross wall 6 forwardly thereof and a crossbar 7 on the upper side of the downwardly stepped front portion. Furthermore, a base plate 8 connects the bottom of the side walls 2 and 3 at the front. The downwardly stepped forward end of the frame is reinforced by a brace 9 at each side running from the rear of the base plate 8 to the bottom of the forward side of the cross wall 6.

Figure 2:
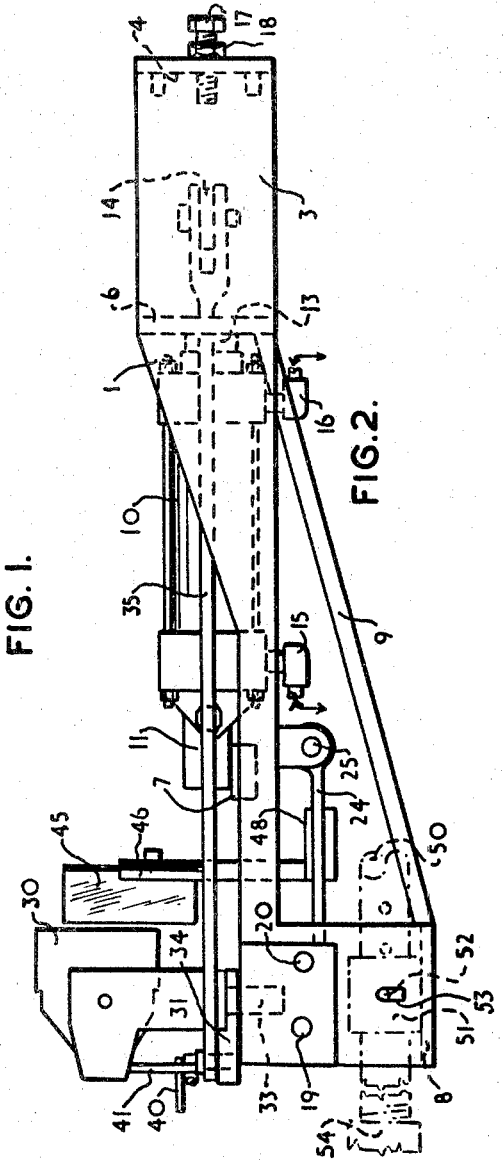
FIGURE 2 is a side elevation thereof.
Figure 3:
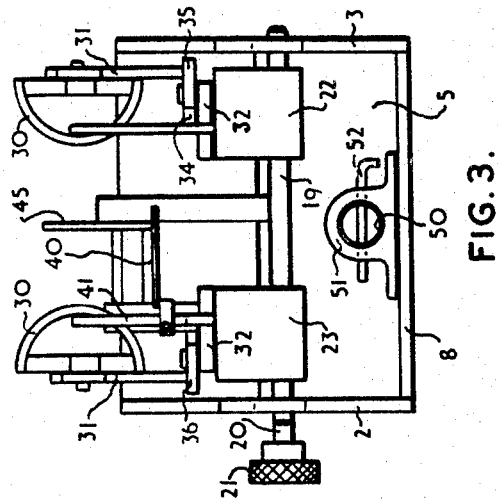
FIGURE 3 is an end elevation thereof.

A compressed air cylinder 10, connected by a mounting bracket 11 with the crossbar 7, has a piston actuated rod 12 sliding in a journal 13 on the forward side of the cross wall 6 and carrying a cross-arm 14 on its outer end. Air in-out connections 15 and 16 supplied from a suitable source under control of the user of the apparatus cause the piston actuated rod 12 to reciprocate from a retracted position as shown in FIGURES 1 and 2 to an extended position where the cross-arm 14 engages the transversely spaced stops 17 adjustably set in the rear end wall 4. These stops are bolts threaded through the end wall and when accurately adjusted are secured in position by lock nuts 18.

A pair of parallel shafts 19 and 20 traverse the forward open end of the frame 1 being arranged at the same level and spaced longitudinally with respect to the frame. The shaft 20 has reverse threads from the center toward opposite ends and is provided externally of the frame with a knurled knob or band wheel 21 whereby it may be rotated.

A pair of spaced blocks 22 and 23 are mounted on the shafts 19 and 20, being located within the sides of the frame 1 and these blocks each have a spaced pair of horizontal transverse bores whereby they are slidable along the shaft 19 and threadedly engage the rear shaft 20. Furthermore, each block has a rearwardly extended arm 24 that slidingly embraces a rearwardly spaced transverse shaft 25. Thus it will be seen that by rotating the knurled knob 21 on the end of threaded shaft 20, the blocks 22 and 23 can be adjusted toward or away from each other from the side walls 2 and 3 of the frame to the center.

An oscillating tube end former 30 is carried by each of the blocks 22 and 23. The former 30 is in the shape of an inwardly facing semi-cylindrical shell of suitable diameter is mounted on a post 31 that is provided with a base 32 that connects by a vertical pivot bearing 33 with the block 22 or 23. A radial arm 34 extends horizontally forwards and outwards from each pivoted former post base 32 at an angle of approximately forty-five degrees to the longitudinal median of the frame 1.

Connecting arms 35 and 36 run to the respective radial former post base arms 34 from opposite ends of the piston rod cross-arm 14, being pivotally connected to both the said radial arms and cross-arm. In this way, the action of the compressed air motor causes the tube end formers 30 to oscillate on pivots 33 through a regulated and equalized angle of approximately ninety degrees.

To support a tube at the desired height to be properly engaged by the oscillating formers 30, having regard to the tube diameter, a vertically adjustable tube rest 40 is slidably mounted on a post 41 rising from one or other of the blocks 22–23.

Figure 5:
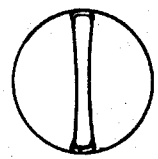
FIGURE 5 is an end view of the deformed end of the tube.
Figure 7:
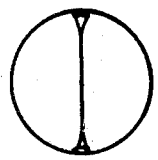
FIGURE 7 is an end view of the resulting deformed end of the longitudinally advanced tube shown in FIGURE 6.

To position the end of a tube relative to the pivot axis of the former 30, a vertically disposed longitudinally adjustable stop 45 is provided approximately on the longitudinal median of the apparatus with its operative forward end substantially in line with the rear edge of the formers when the latter are at rest. This stop is vertically adjustable on a split post 46 that connects by a side arm 47 with a base 48 that is adjustably slidable on a block arm 24. The accurate setting of this end stop 45 relative to the pivot points of the oscillating formers 30 is critical in obtaining the degree of tube end closure desired, as will be seen on reference to the different end closure results shown in FIGURES 5 and 7 in consequence of a small variation in the longitudinally positioning of the tube ends shown in FIGURES 4 and 6. On occasions, these closure machines are preferably mounted in confronting properly spaced pairs whereby both ends of a tube may be operated upon simultaneously. In such installations the distance separating the open front ends of the machines is determined by the length of the tube being handled. Accordingly, it has been found useful to connect the machines by a coupling such as the pipe 50 that passes through aligned sockets 51 on the front base plate 8 of each machine and to secure it in one socket as by a cross pin 52 passed through a transverse bore 53 in the coupling such as may be provided at spaced centers and anchored at the opposite end by a threaded head 54 whereby an accurate spacing of the machines is easily and quickly arranged.

In carrying out this method and utilizing the herein disclosed apparatus, two similar machines are set up in confronting alignment and connected in properly spaced relation by a coupler such as the pipe 50. The tube or other cylindrical container (the terms as here used are regarded as similar and interchangeable) is placed on the rests 40, nested between the respective pairs of formers 30 and with opposite open ends engaging the forward edges of the end stops 45. The cylinder 10 is then fed compressed air through the inlet connection 15 so that its piston is energized and the rod 12 drives the crossarm 14 rearwardly into contact with the stops 17, actuating the connecting arms 35-36 that connect with the radial arms 34 causing the formers 30 to swing on their vertical pivots 33 into engagement with the ends of the tube.

Figure 4:
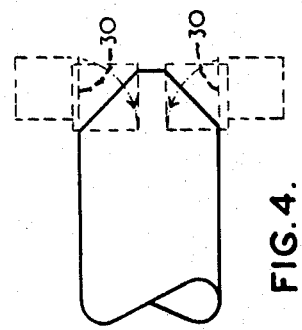
FIGURE 4 is a plan view of a tube end acted on by a pair of formers.
Figure 6:
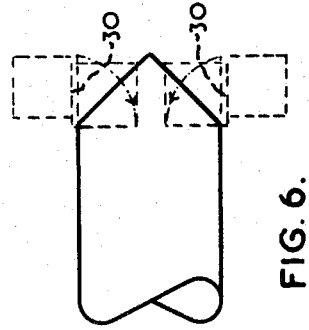
FIGURE 6 is a plan view of another tube end acted on by a pair of formers, the tube having been set in an advanced longitudinal position relative to the operative path of the formers.

It will be noted, on reference to FIGURES 1, 4 and 6 that the oscillating action of the former 30 causes it to engage the open end of the tube wall at an angle as well as bringing only the mid-point of the former arc into contact with a modicum of the tube end at the beginning of the deforming action and progressively engaging more and more of the tube end by an increasing portion of the former arc until at the end of the former stroke or swing the peripheral section of the tube end being deformed is fully engaged by the former to the base of the deformation.

FIGURES 4, 5, 6 and 7 illustrate clearly how the longitudinal positioning of the tube end, relative to the axis of the pivot of the former, determines the depth to which the peripheral section of the tube end shall be deformed—and consequently the distance such deformed peripheral section shall extend across the mouth of the tube.

From the foregoing description taken in connection with the accompanying drawings, it will be manifest that a method of and apparatus for forming a closure on the end of a tube or other cylindrical container is provided that will fulfil all the necessary requirements of such a method and apparatus, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. Apparatus for forming a closure on an end of a cylindrical container comprising a frame means on the frame for vertically adjustably supporting the container in a horizontal position, container-end deforming means on the frame, said means consisting of a pair of oscillating formers, each former having a semi-cylindrical body, said formers when in operative position lying alongside one end of the container, and air means for actuating said formers whereby said formers may each be moved angularly through approximately 90° in a direction towards the axis of the container and towards the other end of the container, whereby said formers are adapted to deform opposed peripheral sections of said end, each inwardly through an angle of approximately 90°, in edge to edge relation with one another.

2. Apparatus for forming a closure on the end of cylindrical container according to claim 1, wherein said formers, simultaneously are oscillated, and wherein a screw is provided for manually moving the formers toward and away from each other.

References Cited

UNITED STATES PATENTS

| 2,160,617 | 5/1939 | Kellner | 113—121 |
| 2,244,059 | 6/1941 | Pechheimer | 113—121 |
| 2,518,970 | 8/1950 | Zabel | 53—22 |
| 2,587,663 | 3/1952 | Socke | 53—366 |
| 2,707,584 | 5/1955 | Hoover et al. | 53—22 |
| 2,767,537 | 10/1956 | Price et al. | 53—366 |
| 2,911,778 | 11/1959 | Ozor | 53—371 |

TRAVIS S. McGEHEE, *Primary Examiner.*

R. L. FARRIS, *Assistant Examiner.*